June 24, 1969 N. R. BUCK 3,451,619
CHECK DIGIT CALCULATOR
Filed Sept. 11, 1967
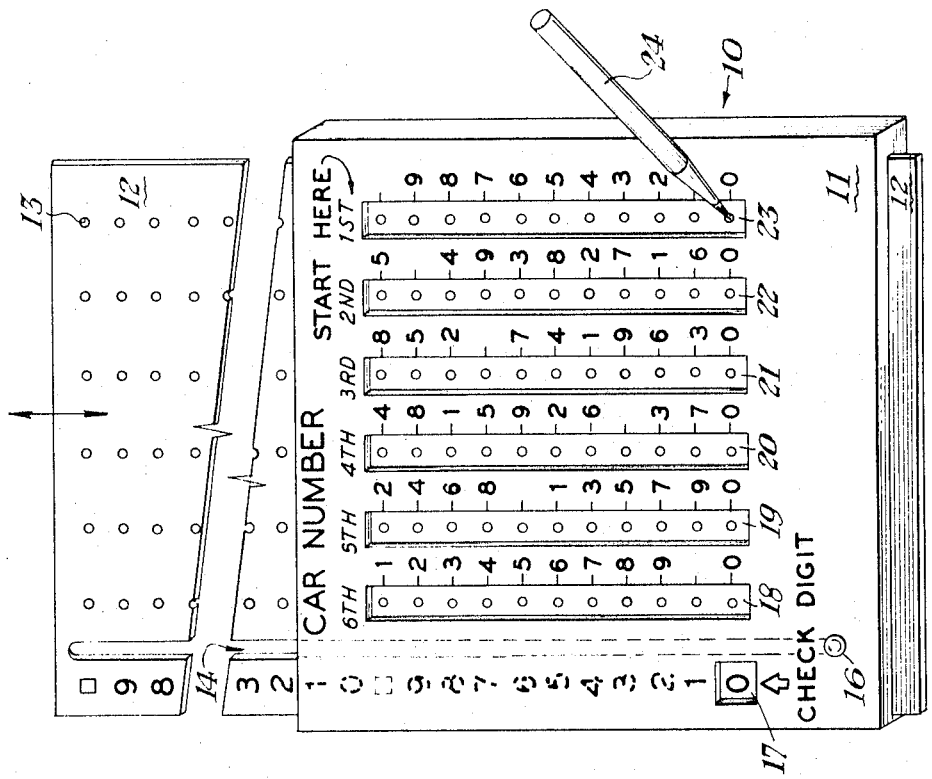
Fig. 1.
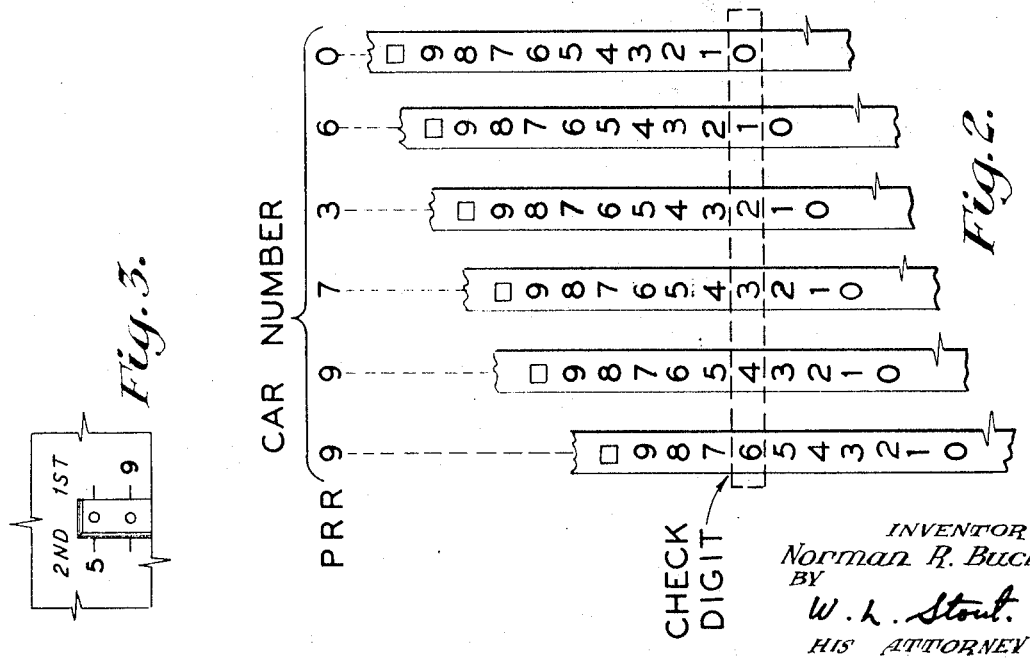
Fig. 2.
Fig. 3.
INVENTOR
Norman R. Buck
BY
W. L. Stout
HIS ATTORNEY

United States Patent Office 3,451,619
Patented June 24, 1969

3,451,619
CHECK DIGIT CALCULATOR
Norman R. Buck, Newton, Mass., assignor to Westinghouse Air Brake Company, Swissvale, Pa., a corporation of Pennsylvania
Filed Sept. 11, 1967, Ser. No. 672,411
Int. Cl. G06c 1/00
U.S. Cl. 235—61                                    9 Claims

ABSTRACT OF THE DISCLOSURE

This invention relates to a check digit calculator wherein a number group which is to have a check digit added is computed by the calculator and provides the check digit by the addition of remainders, which remainders are arrived at by the multiplication of each digit of the number group by $[a^{(n-1)}]$, and dividing by a natural number which results in a remaining whole number where the base $a$ is any natural number and where $n$ in the exponential expression is the number count of a position of a digit within the number group.

---

This invention relates to a check digit calculator.

More specifically, this invention relates to a check digit calculator wherein a number group which is to have a check digit added is computed by the calculator and provides the check digit by the addition of remainders, which remainders are arrived at by the multiplication of each digit of the number group by $[a^{(n-1)}]$, where the base $a$ is any natural number and where $n$ in the exponential expression is the number count of a position of a digit within the number group and these remainders when added are divided by a natural number which results in a remaining whole number, the resulting remainder being the check digit.

Today with the trend toward computer data processing expanding at a phenomenal rate new problems in checking data are arising. One area that has just begun to emerge is in the field of automatic train identification. Here train cars, each having a number thereon are electronically scanned from the wayside as the train car passes. The data taken from the train car is then processed by a central computer, which computer determines the ultimate use and/or storage of the information.

In the United States and Canada the marking of these cars is controlled by the Association of American Railroads (AAR), which has specified that along with each car number there shall be a check digit. The check digit has been defined by B. Rothery in the "Data Processing Magazine," June 1967, on p. 58 in terms similar to the following. The "check digit" is a "code used in an arithmetic system involving remaindering, which is added to digits to come up with a figure between one and ten. This figure is appended to the field adjacent the number." During future transcription, if any digit in the field is wrongly entered, or dropped, or gets switched with another, the computer in recalculating the check digit will come up with a different result to the one already entered, thereupon rejecting the "document" or car number involved.

As pointed out earlier, the invention is directed to the solving of a complex equation which equation has been specified by the AAR. Needless to say that while this equation may be solved almost instantly when an appropriate computer is available, such is not the case where train cars are involved. In the field workers who must label or relabel cars will not have the benefit of a computer and it is to these people that this invention will provide an advantage by providing them with a small calculator that will rapidly and accurately solve the equation and present the appropriate check digit.

It is therefore an object of this invention to provide a check digit calculator which is small in size and weight that can be employed to quickly provide a check digit derived from a complex equation.

Another object of this invention is to provide a check digit calculator that can provide a check digit for any number with ten or less integers.

In the attainment of the foregoing objects, a calculator has been invented to determine a check digit where the number group to which the check digit is to be applied does not exceed ten digits and where the calculator is comprised of first and second members movable relative to each other. The first member has thereon a plurality of numerical scales equal to the total number of digits in the number group for which the calculator is to provide the check digit. Each of the numerical scales has thereon at least ten digit positions. The digit positions on each of the numerical scales are of a remainder when each particular digit of the number group is multiplied by $[2^{(n-1)}]$, where $n$ is the number count of the scale representing one of the digits in the number group and the resulting multiplied product is divided by eleven. In addition a zero digit will define the starting point of each scale. The first member also includes thereon a check digit index point.

The second member has thereon a plurality of scales cooperatively disposed in relation to the numerical scales of the first member. Both the first and second members have a start position where each of the plurality of scales on the second member is initially aligned with the digit positions on the numerical scale of the first member. The second member further includes a check digit scale which is representative of the aforementioned remainder. This check digit scale includes a series of progressions at least equal in number of the total number of numerical scales on the first member and have spacings equal to the digit spacings of the numerical scales. Accordingly, whenever the calculator's first and second members are manipulated to accomplish consecutive selective unidirectional movement from the start position, determined by the number group for which a check digit is sought, there will be accomplished the adding of remainders to produce the appearance of a check digit on the check digit scale of the second member at the check digit index point of the first member.

Other objects and advantages of the present invention will become apparent from the ensuing description of illustrative embodiments thereof, in the course of which reference is had to the accompanying drawings in which:

FIG. 1 depicts a preferred embodiment of the invention.

FIG. 2 illustrates the various steps in the mechanical manipulation of the calculator shown in FIG. 1 for performing a check digit calculation.

FIG. 3 sets forth a fragmentary portion of the calculator illustrating an alternate embodiment of the invention.

A description of the above embodiments will follow and then the novel features of the invention will be presented in the appended claims.

Reference is now made to FIG. 1 wherein there is depicted a check digit calculator 10. The check digit calculator 10 is comprised basically of two members, a first member 11 and a second member 12. From this illustration shown in FIG. 1 it will be noted that this second member 12 is inserted within the first member 11. While this FIG. 1 shows what appears to be a solid continuous first member 11, it should be understood that the physical construction of the first member 11, as well as the size and thickness of the second member 12, is wholly dependent upon the design and cost characteristics sought in the manufacture of this calculator. In this FIG. 1 the check digit calculator 10 has been shown having what appears to be solid molded first member 11, but of course it should be recognized that this could be made of two separate pieces of material spaced apart with the second member 12 sandwiched therebetween for relative movement within the member 11. All that is necessary is that the first member 11 and the second member 12 be capable of relative movement therewith.

As the description ensues it will be appreciated that, while in this embodiment the check digit calculator is shown with two members which move in a unidirectional relative movement to each other, in a reciprocating fashion, actually the first member and the second member could in fact be circular members with their uniform relative movement one to another about some central point providing the same functional cooperation necessary to allow the calculator to produce the check digit results herein noted.

Keeping this in mind, the check digit calculator 10 will be described hereafter in its preferred embodiment, that is, where the second member moves in a unidirectional motion relative to the first member 11. The first member 11 has therein a plurality of windows 18, 19, 20, 21, 22 and 23. Adjacent these windows are a series of scales. For example, above the window 23 there is designated the first scale, and in a similar fashion it can be seen that there is a first, second, third, fourth, fifth and sixth scale above the respective windows just noted. Again, it should be kept in mind that while in the preferred embodiment windows are employed, the first member 11 could also be of a clear material with the scales for the first, second, third, fourth, fifth and sixth windows being provided by clear plastic type material and the need for windows of course would then not be necessary.

Going on with the description of the physical characteristics of the calculator, the second member 12 has in this application a number of scales thereon. These scales are represented by a series of openings 13 in the second member 12, and of course it should be understood that while these are shown as openings they might as well be marked scales on the second member and need ont necessarily be openings. The spacing of these openings or the scale just referred to will be discussed more fully hereafter.

To the very far left of the second member 12 there is a numerical scale which takes on the appearance of a progression of numbers of 0 through 9 which may be seen in the left-hand portion of FIG. 1 shown with the reference numerals in a dotted fashion to depict the illusion of being beneath the surface of the first member 11 with the check digit 0 located within the window 17 or index point on the first member 11. It can be seen that as the second member 12 is moved downwardly relative to the first member 11, the numerals 1, 2, 3 through 9 . . . would appear consecutively in the check digit window 17. There is also located within the second member 12 a slotted opening 14 which extends the full length of the second member 12. This slot 14 cooperates with a rivet or stop means 16 shown passing through the first member 11 as well as the slotted opening 14 in the member 12. When the second member 12 is in its most upward position, that position controlled by the stop means 16, the calculator is then in the proper physical mode to be operated to calculate a check digit which will be explained more fully hereafter.

It should also be appreciated that the second member 12 has been shown separated in the uppermost portion of FIG. 1. This is intended to create the illusion that the second member 12 is much longer in fact than that which has been depicted in this figure. It has been deemed unnecessary to show the member 12 in its actual length. The actual length of the second member 12 of course is going to be determined by the numerical number of integers present in the number for which a check digit is to be calculated. The series of progressions which have been shown in the check digit column will be defined more fully hereafter. Note also in the check digit column, which is represented by those digits which consecutively appear in the check digit window, that the number 10 has been omitted from the standpoint from its physical appearance as a numeral 10 and has been, for purposes of design, designated as a box or a square shown in dotted outline in FIG. 1 just above the numeral 9 also shown in its dotted configuration.

Accordingly, whenever the box or square appears throughout the specification and in the description it will be treated as a 10.

Now that a physical description of the calculator has been completed an operational description and the theory behind the positioning of the scales present on this calculator will be entertained. As has been noted, there are a plurality of scales shown on the first member 11 and designated as the first, second, third, fourth, fifth and sixth scale. This particular calculator has been selected to be typical of the six integer numeral or number group found on train cars which are to be labeled and which are to include a check digit as required by the AAR. It should also be understood that while six scales have been shown, if the number for which a check digit was sought had but two integers, only two scales would be necessary on the first member. Therefore, the number of scales present on the first member will be determined by the number of integers in the number for which the check digit is sought, or in the event that fewer digits are present in a number than the calculator was designed for, the missing digits are treated as zeros preceding the number.

Now the positioning of the numbers on the scales on the first member is to be determined by the following rule. Each of these numerical scales appearing on the first member must have at least ten digit positions. The digit positions of each of the numerical scales are to be representative of a remainder when each particular digit of the number group is multiplied by $[2^{(n-1)}]$ where $n$ is the number count of the scale representing one of the digits in the number group, and the resulting multiplied product is divided by eleven. In each of the scales a zero digit defines the starting point of each scale. Note, of course, that the first member also includes an index point or check digit window positioned somewhere on the first member.

Now, for example, note the following calculation for the position of the digit 4 in the fifth scale indicative of a integer 4 taking the position of a fifth integer in the number for which a check digit is to be calculated.

Considering the expression $2^{(n_5-1)}$ where $n$ equals the scale number and the subscript designates this position, in this instance five (5) the resulting substitution would be $$2^{(5-1)} = 2^4 = 16$$

Accordingly, by employing a second term of six number expression which has been set forth by the AAR $$\frac{A \times 2^{(n_6-1)} + B \times 2^{(n_5-1)} + C \times 2^{(n_4-1)} + D \times 2^{(n_3-1)} + E \times 2^{(n_2-1)} + F \times 2^{(n_1-1)}}{11}$$

namely $$\frac{B \times 2^{(n_5-1)}}{11}$$

wherein B equals integer 4 we have $$\frac{4 \times 2^{(5-1)}}{11} = \frac{4 \times 2^4}{11} = \frac{4 \times 16}{11} = \frac{64}{11} = 5\frac{9}{11}$$

wherein the remainder 9 corresponds to the digit position of the integer 4 on the fifth scale. Viewing the fifth scale of FIG. 1 it is readily noted that the scale position of digit 4 is the ninth position on this scale. Accordingly, a similar calculation for this scale as well as the other scales will locate each digit position of a particular integer on its corresponding scale.

It has now been shown that the digit position on any of the numerical scales of the first member may be precisely defined by the equation explained above. There appears on the second member a plurality of scales, as noted earlier in this case openings 13 are defined as scales, and these openings are cooperatively disposed in relation to the numerical scales of the first member so that movement of the second member relative to the first causes the scale to move relatively to the numerical scales on the first member 11. Now, as noted earlier, the first member 11 and the second member 12 have what is termed as a "start" position, that is when the rivet 16 is at the base of the elongated opening 14 in the second member. Now the scales are all aligned. These scales of the first and second members are therefore initially aligned with the digit positions of the first member aligned with the scales of the second member. The second member also includes a check digit scale noted earlier, this check digit scale will consecutively appear at the index point or window 17 on the first member which has been labeled check digit. This check digit scale includes a series of progressions at least equal to the total number of the numerical scales on the first member and having spacings equal to the digit spacings of the numerical scales. Note here we have shown but a single complete progression, 0 through 10 where the 10 is represented by a square. Therefore, the second member 12 would of necessity require, because of the number of scales present on the first member, at least six of these progressions. In the event that this calculator is manipulated to find a check digit for a number which in the adding of the remainders requires the maximum relative travel between the first member 11 and the second member 12, there all six progressions would be employed. Accordingly, if there were but two integers in the number for which a check digit was sought, then there would only be required two progressions in the check digit scale.

There has been shown but one progression in the check digit scale for reasons of preserving room in the drawings and facilitating a subsequent description of the operation of the calculator in the determination of a check digit for a car number to be explained more fully hereafter.

At this time there will be presented a mathematical analysis of the basic equation about which this calculator is designed to function.

If we have a "number" represented by the following expression "A B C D E F G H I J" where A through J each may be any integer from 0 to 9, the check digit is to be calculated by the following equation and is to be defined as the remaining integer from the following equation:

$$\frac{A \times 2^{(n_9-1)} + B \times 2^{(n_8-1)} + C \times 2^{(n_7-1)} + \ldots J \times 2^{(n_1-1)}}{11}$$

where $n$ is the numerical value of the digit position of the "number" counted from right to left, and the subscript designates the corresponding scale. Accordingly, if we had a vehicle identified as "PRR997360," with this combination of characters indicating that it is owned by the Pennsylvania Railroad and that it bears their number

"997360"

the above equation would appear as follows $$\frac{(9 \times 2^5) + (9 \times 2^4) + (7 \times 2^3) + (3 \times 2^2) + (6 \times 2^1) + (0 \times 2^0)}{11}$$

$$\frac{(9 \times 32) + (9 \times 16) + (7 \times 8) + (3 \times 4) + (6 \times 2) + (0 \times 1)}{11} =$$

$$\frac{288 + 144 + 56 + 12 + 12 + 0}{11} = \frac{512}{11} = 46\frac{6}{11}$$

wherein the integer 6, namely, the remainder, is termed the "check digit."

The check digit of 6 would be added to the original number so that the final number would appear as follows:

"9973606"

From the above it will be seen that there is required a rather lengthy mathematical computation in which there is the adding of remainders and the division by eleven to provide a check digit of 6.

FIG. 2 sets forth an environment in which an explanation of the operation of this calculator may better be appreciated. At the top of FIG. 2 appears the designation PRR997360. This would stand for, for example, the Pennsylvania Railroad and the number of the car would be 997360. Now, a man who is in the field and has been told to provide a check digit to this number would either have to solve the mathematical equation described above, or better yet utilize the calculator which is the subject of the invention being described. Of course, if there were available in the field an electronic computer that was programmed to this equation, the solution of this equation and the determination of the check digit would be an easy matter. But, of course, such is not the case.

Proceeding now with the operation of the calculator. It should be understood that the number selected 997360 was selected to show the operation of the calculator but not to show the maximum variation in physical movement which the calculator might experience. In other words, in order to keep the calculators second member 12 within the confines of the physical limitations of a drawing this number was selected with the thought in mind of providing a number which would use the minimum movement of the calculator. A different number, of course, would cause the calculator's second member 12 to possibly have a very extensive excursion and therefore would make the description of a different number that much more difficult.

Note in FIG. 1 there is a pointed actuator 24. This could readily be a pencil or any pointed instrument used to be inserted within the openings 13. This pointed instrument 24 would be placed in the holes and pulled downwardly to cause the second member 12 to move relative to the first member 11. Of course, the first member 11 is held in the hand of the individual who is manipulating the calculator. While in this preferred embodiment holes or openings have been placed on the scales of the second member 12, one could as well have scribed marks thereon and the party operating the calculator would maintain a studied view of the scale which was being moved downwardly and no pointed instrument would be necessary, but it is felt that this arrangement allows for the maximum security from the standpoint of always producing the correct check digit and thereby reducing the possibility of human error.

Now, as has been noted, the numerical scales on the first member 11 have been designated as first and second through the sixth. These are to correspond with the integer 5 of the car number. Accordingly, the first scale to be used in conjunction with the integer on the right-hand side of the car number is 0. Of course, when the pointed instrument 24 is inserted in the opening corresponding to the 0 digit position on the first numerical scale, no movemnt at all will occur. And, as can be appreciated, there has been illustrated in FIG. 2 a plurality of check digit column positions which correspond to the movement of the second member 12 in relation to the first member 11 whenever the pointed instrument 24 has been inserted in one of the openings in the scales present on the second member 12 and then moved downwardly. Therefore, viewing FIG. 2 from right to left there will be seen a number of different positions of a portion of the second member 12, in this instance just shown as broken out columns of check digit integers 0 through 9. As has been noted, when the operator places the pointed instrument 24 in the opening in the first scale at the 0 point, no movement whatsoever will occur in the second member 12 and therefore in the column of check digits beneath the integer 0, shown in FIG. 2, there will appear a 0 in the check digit window. The check digits that will consecutively appear in the window have been for purposes of illustration shown in an elongated dotted outline block which has been drawn covering all of the positions of the check digit column as the check digit calculator is manipulated by the operator. Accordingly, when the second integer of the car number is to be placed in the calculator, the operator would take the pointed instrument 24, go to the second scale, place the pointed instrument 24 in the opening opposite the digit 6, and pull downward until the pointed instrument came to a stop opposite the 0 digit in the second scale. This would cause the check digit 1 to appear in the window, and as can be seen from FIG. 2 in the second check digit column from the right, a 1 would appear in the window. In a similar fashion the operator would then go to the third scale indicative of the third digit counting off from the right and insert the pointed instrument in the opening aligned with the digit position 3 and pull downward and a check digit of 2 would then appear in the window. Similar operations for the integers 7, 9 and 9 would produce a check digit 6 shown in the last column to the left in FIG. 2.

It can therefore be seen that there has been by elementary manipulation of the calculator a highly accurate and quickly attainable check digit which may be inserted adjacent the car number as noted earlier. Therefore, all that is required is but six quick deft movements by the operator to produce the check digit in the window and the operation is complete. When one views the entire problem of applying check digits to millions of train cars the country over, the advantage of this calculator and its usefulness become increasingly significant and the invention provided herein shows itself as one which definitely advances the technology in permitting the use of check digits within data processing systems that are emerging in the market place, and therefore represents an advance in the art.

Reference is now made to FIG. 3. FIG. 3 shows another variation of the positioning of the scales on the first member. In this embodiment the cutout portion designated by the irregular borders of the illustrated cutout portion, sets forth the situation where you may reduce by as much as one-half the number of scales necessary for a calculator of this type by placing on either side of a window, as shown in FIG. 3, the digit positions and their respective scales, thereby reducing the total number of windows or openings needed in the first member 11. This of course would make the calculator that much more compact and in those instances where compactness is desired, this invention contemplates the utilization of this type of scale arrangement.

It will be appreciated that while the specific calculator shown and disclosed is directed to calculating a check digit in accordance with the AAR requirements, the underlining inventive concept of the calculator may be employed in other areas where the addition of remainders is basic to the determination of a check digit. Further, it is understood that in these other areas it may be desired to employ a different base, divisor and a number group so that the equation may take the general form of;

$$\frac{[A \times a^{(n-1)}] + \cdots \text{etc.}}{X}$$

where the base $a$ is any natural number, and
where $n$ is the number count of a position of a digit with the number group, and
where the divisor $X$ is a natural number which results in a remaining whole number.

While the invention has been particularly shown and described with reference to a preferred embodiment thereof, it will be understood by those skilled in the art that the foregoing and other changes in form and details may be made therein without departing from the spirit and scope of the invention.

Having thus described my invention, what I claim is:

1. A calculator for determining a check digit where the number group to which the check digit is to be applied does not exceed ten digits and where said calculator is comprised of first and second members movable relative to each other,
   (a) said first member having thereon a plurality of numerical scales equal to the total number of digits in the number group for which said calculator is to provide said check digit,
      each of said numerical scales having at least ten digit positions thereon,
      said digit positions on each of said numerical scales being representative of a remainder when each particular digit of said number group is multiplied by $[2^{(n-1)}]$,
      where $n$ is the number count of the scale representing one of the digits in the number group, and
      the resulting multiplied product is divided by eleven and wherein a zero digit defines the starting point of each scale,
      said first member including a check digit index point thereon,
   (b) said second member having thereon a plurality of scales cooperatively disposed in relation to said numerical scales of said first member,
      said second and first members having a start position where each of said plurality of scales of said second member are initially aligned with said digit positions on said numerical scales of said first member,
      said second member also including a check digit scale which is representative of said remainder,
      said check digit scale including a series of progressions at least equal to the total number of numerical scales on said first member and having spacings equal to the digit spacings of said numerical scales,
      whereby the consecutive selective movement of said second member from said start position, determined by the number group for which a check digit is sought, will result in the adding of remainders to produce the appearance of a check digit on said check digit scale of said second member at said check digit index point of said first member.

2. The calculator of claim 1 where said number group may be represented by the expression

A B C D E F G H I J where A through J each may be any integer from 0 to 9,
   said check digit to be calculated by said calculator will be determined by the following equation and is to be defined as the remaining integer which results from a solution of this equation $$\frac{[A \times 2^{(n_9-1)}] + [B \times 2^{(n_8-1)}] + [C \times 2^{(n_7-1)}] + \cdots [J \times 2^{(n_1-1)}]}{11}$$

where $n$ is the numerical value of the digit position of said number counted from right to left and the subscript designates the corresponding scale.

3. The calculator of claim 1 wherein said first member includes at least as many window openings along which said numerical scales appear as there are numerical scales.

4. The calculator of claim 1 wherein said first member includes one-half as many windows as there are numerical scales on said first member and said numerical scales appear on either side of said windows.

5. The calculator of claim 1 wherein said scales of said second member are comprised of openings in said second member.

6. The calculator of claim 1 wherein said first member has a stop means cooperating with said second member to ensure proper starting alignment of the various scales.

7. The calculator of claim 1 wherein said scales on said second member in addition to being cooperatively disposed to said numerical scales of said first member are also in continuous alignment with said numerical scales whenever said relative movement occurs.

8. The calculator of claim 7 wherein the consecutive selective movement is a unidirectional movement.

9. A calculator for determining a check digit wherein a number group which is to have a check digit added is computed by the calculator and provides the check digit by the addition of remainders, said calculator comprising, first and second members movable relative to each other, (a) said first member having thereon a plurality of numerical scales equal to the total number of digits in the number group for which said calculator is to provide said check digit, each of said numerical scales having at least ten digit positions thereon, said digit positions on each of said numerical scales being representative of a remainder when each particular digit of said number group is multiplied by $[a^{(n-1)}]$, where the base $a$ is any natural number, and where $n$ in the exponential expression is the number count of the scale representing one of the digits in the number group, and the resulting multiplied product is divided by a natural number which results in a remaining whole number and wherein a zero digit defines the starting point of each scale, said first member including a check digit index point thereon, (b) said second member having thereon a plurality of scales cooperatively disposed in relation to said numerical scales of said first member, said second and first members having a start position where each of said plurality of scales of said second member are initially aligned with said digit positions on said numerical scales of said first member, said second member also including a check digit scale which is representative of said remainder, said check digit scale including a series of progressions at least equal to the total number of numerical scales on said first member and having spacings equal to the digit spacings of said numerical scales, whereby the consecutive selective movement of said second member from said start position, determined by the number group for which a check digit is sought, will result in the adding of remainders to produce the appearance of a check digit on said check digit scale of said second member at said check digit index point of said first member.

References Cited

UNITED STATES PATENTS

| | | | |
|---|---|---|---|
| 3,033,450 | 5/1962 | Zitnik | 235—83 |
| 3,272,431 | 9/1966 | Dablo | 235—69 |
| 3,386,653 | 6/1968 | Phipps | 245—61 |

STEPHEN J. TOMSKY, *Primary Examiner.*

U.S. Cl. X.R.

235—69, 83, 85